No. 662,602. Patented Nov. 27, 1900.
W. SCHMIDT & J. BERBERICH.
VELOCIPEDE BRAKE.
(Application filed July 24, 1899.)
(No Model.)
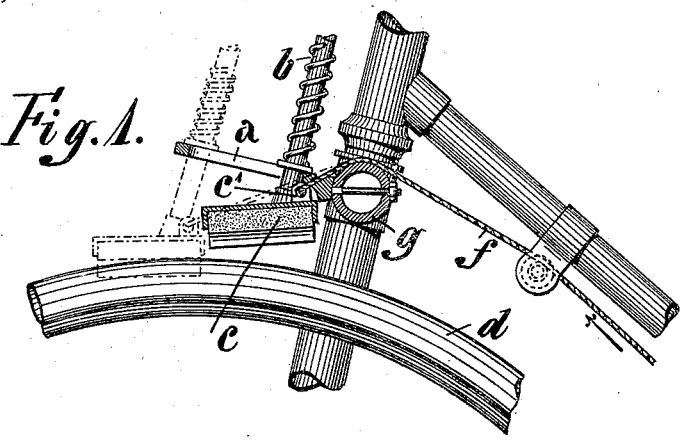
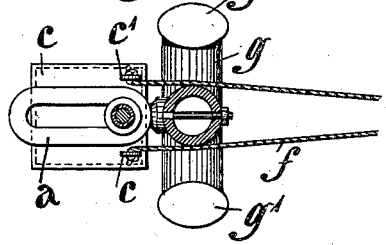
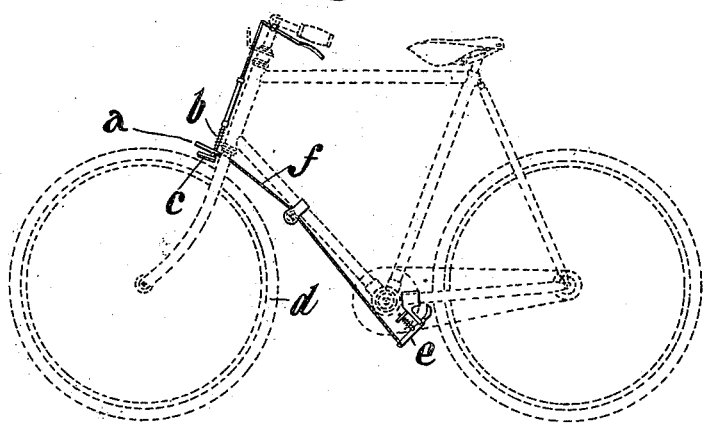
Witnesses.
Inventors.
Wilhelm Schmidt
Josef Berberich

UNITED STATES PATENT OFFICE.

WILHELM SCHMIDT, OF HEIDELBERG, AND JOSEF BERBERICH, OF NEUSTADT, GERMANY.

VELOCIPEDE-BRAKE.

SPECIFICATION forming part of Letters Patent No. 662,602, dated November 27, 1900.

Application filed July 24, 1899. Serial No. 725,016. (No model.)

*To all whom it may concern:*

Be it known that we, WILHELM SCHMIDT, residing at Heidelberg, and JOSEF BERBERICH, residing at Neustadt-on-the-Haardt, Germany, have invented certain new and useful Improvements in or Relating to Brakes for Velocipedes, of which the following is a specification.

The object of our invention is an arrangement by means of which the wheelman has only to manage one brake, whereby the speed of the fore wheel, as well as that of the hind wheel, is effectively checked.

In general our invention consists in the following: The construction of the arrangement allows the rod by which the brake-block for the fore wheel is forced down and brought into contact with the tire to follow somewhat the motion of the fore wheel, so that by this forward movement a brake for the hind wheel connected with that rod by a string is drawn in such a direction that it is pressed effectively on the hind wheel.

Referring to the drawings which form a part of this specification, Figures 1 and 2, which represent the proper illustration of the device, are respectively a side view and a ground plan of the brake for the fore wheel. Fig. 3 is a general view of the arrangement of our invention.

The rod $b$, which bears at its lower end a brake-block $c$ and is hinged at the upper end to the lever by means of which the wheelman actuates the brake, is guided in a slot of a bracket $a$, fastened to the connecting-piece $g$ of the fork-arms $g'$ of the fore wheel. The bracket $a$ thus extends over the fore wheel and the slot is formed in it in the plane of the wheel. A brake $e$ of any suitable construction is attached to the frame in front of the rear wheel and kept off from the latter by a spring. The two brakes are connected with one another by cords $f$, which are tied through eyes $c'$ of the brake-block casing $c$, conducted over the cross-head $g$ of the fork, and a pulley attached to the fore part of the frame and fastened to the lever of the rear brake $e$.

If the wheelman by actuating the brake-lever presses the brake-block $c$ down on the tire $d$ of the fore wheel, the latter by the rotation pulls the block $c$ forward, whereby the rod $b$ slides in the slot of the bracket $a$, and at the same time by means of the cords $f$ the brake of the hind wheel is actuated, so that both wheels are brought to a standstill simultaneously.

Having now described our invention, what we claim as new, and desire to secure by Letters Patent, is—

In a brake for velocipedes the combination with a brake-block, $c$, fastened to the lower end of a rod, $b$, of a guide-piece, $a$, attached to the front of the fork of the fore wheel, having a longitudinal slot, in which said rod slides forward, after the block is pressed on the tire, $d$, of the fore wheel and pulled forward by the latter on its rotation; a brake, $e$, for the rear wheel; and cords, $f$, connecting the brake-block, $c$, with the lever of the brake, $e$, said brake being thus actuated by the forward motion of the block $c$.

In witness whereof we have hereunto set our hands in presence of two witnesses.

WILHELM SCHMIDT.
JOSEF BERBERICH.

Witnesses:
JACOB ADRIAN,
R. LINDERMANN.